United States Patent Office 3,652,536
Patented Mar. 28, 1972

3,652,536
NOVENAMINE COMPOUNDS AND DERIVATIVES
Oldrich K. Sebek and Herman Hoeksema, Kalamazoo, Mich., assignors to The Upjohn Company, Kalamazoo, Mich.
No Drawing. Filed June 2, 1969, Ser. No. 829,757
Int. Cl. C07c 47/18
U.S. Cl. 260—210 R          6 Claims

ABSTRACT OF THE DISCLOSURE

Enzymatic cleavage of the amide bond in the antibiotic novobiocin yields novenamine, a novel compound, having the structure:

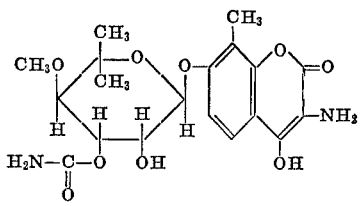

Novenamine is antibacterially active and, thus, can be used as an antibacterial agent. Further, it can be acylated to form novel compounds which possess antimicrobial properties.

BRIEF SUMMARY OF THE INVENTION

This invention relates to a novel process for enzymatically cleaving the amide bond in the antibiotic novobiocin, and to a novel compound produced by such a process. More particularly, this invention is directed to enzymatic cleavage of the amide bond in the antibiotic novobiocin to yield 3-amino-4-hydroxy-7-O[3-O-carbamoyl-4-O-methyl-5-deoxy-5,5-dimethyl-$\beta$-L-lyxopyranosyl]methyl coumarin, which has been given the trivial name novenamine. Novenamine also can be obtained by the enzymatic cleavage of dihydronovobiocin.

Novobiocin is an antibiotic obtainable as an elaboration product of a novobiocin-producing streptomycete. Methods for the production, recovery, and purification of novobiocin are described in U.S. Pat. 3,049,534. Novobiocin is a well-known antibiotic useful in the treatment of staphylococcal infections and in urinary tract infections caused by certain strains of proteus. It shows no cross-resistance with penicillin and is active against penicillin-resistant strains of Staphylococcus aureus. Dihydronovobiocin is an antibiotic prepared by hydrogenating novobiocin according to the procedures disclosed in U.S. Pat. 3,175,944. Prior to the subject invention, those in the antibiotic art have not been able to cleave the novobiocin molecule in a manner to yield the compound called novenamine. Thus, the applicants' process for enzymatic cleavage of novobiocin to yield novenamine is the first known process for accomplishing such a result and is the first known process for placing novenamine in possession of one skilled in the art.

DETAILED DESCRIPTION

Novenamine (U–33,918), a novel compound of the subject invention, is prepared by enzymatic cleavage of Novobiocin or dihydronovobiocin with a novel microorganism which has been identified as an Arthrobactor sp. It was discovered that this bacterium elaborates an enzyme which cleaves novobiocin into novenamine and 4-hydroxy-3-(3-methyl-2-butenyl)-benzoic acid. This enzymatic hydrolytic cleavage is accomplished under anaerobic conditions and gives quantitative yields of the cleavage products.

(A) THE MICROORGANISM

(1) Description

The bacterium used according to this invention for the enzymatic cleavage of novobiocin has been identified as an Arthrobacter sp., and for purposes of this application is referred to as N–18. N–18 is a new bacterium. One of its strain characteristics is the ability to elaborate an enzyme which cleaves novobiocin. A subculture of the living organism was deposited without restriction and can be obtained from the permanent collection of the Northern Utilization and Research Division, Agricultural Research, U.S. Department of Agriculture, Peoria, Ill., U.S.A. Its accession number in this repository is NRRL B–3652.

The bacterium N–18 is a non-motile, pleomorphic, gram-negative bacterium of variable length, sometimes of coccoid appearance. It grows well in a variety of laboratory media containing various carbon and nitrogen sources, for example, peptone, casein digests, lactalbumin digests, tryptone, trypticase, and the like. With the exception of methionine and valine, N–18 utilizes all the common amino acids as carbon and nitrogen source for growth, for example, aspartate, glutamate, lysine, arginine, histidine, proline, hydroxyproline, asparagine, glutamine, glycine, alanine, leucine, isoleucine, serine, threonine, tyrosine, phenylalinine, and tryptophan. It also utilizes novobiocin in the same manner. The following compounds also can serve as carbon source for growth: ribose, xylose, glucose, fructose, galactose, gluconate, 2-ketogluconate, p-hydroxybenzoate, citrate, and glycerol, but not arabinose, sorbose, maltose, sucrose, lactose, dextrin, starch, rhamnose, raffinose, inositol, sorbitol, mannitol, or p-aminobenzoate. Ammonium salts serve as adequate nitrogen sources for growth. The bacterium N–18 grows well aerobically at 20, 28, 32, and 37° C., but not at 42 or 5° C. It is catalase positive, but the cytochrome oxidase, indole, Voges-Proskauer and urease tests are negative. It does not reduce nitrate to nitrite, does not liquefy gelatin, and does not produce $H_2S$. Tests for arginine, lysine, and ornithine decarboxylases are negative. The bacterium forms acids from sugars without gas evolution. It is on the basis of the above data this bacterium has been designated as belonging to the genus Arthrobacter.

(2) Maintenance

The bacterium is maintained on slants of agar medium containing 00.5 g. tryptone, 1 g. Brer Rabbit molasses, 1 g. glycerol, 0.25 g. yeast extract, and 1.5 g. agar (pH 6.8), stored at 5° C. and transferred in 2–4 week intervals. The bacterium also can be maintained on media of comparatively simple composition, for example, 0.2% Difco Casitone agar of 0.1% glucose, 0.05% $NH_4Cl$ and inorganic salts, or 0.1% glucose and 0.05% yeast extract. Complex media, for example, Brain Heart Infusion broth, do not favor the elaboration of the novobiocin-cleaving enzyme which is designed herein as novobiocin acylase.

(3) Growth conditions

The cells of bactrium N–18 can be grown and produces novobiocin acylase in a variety of media consisting of various carbon and nitrogen sources as long as good growth of the bacterium is obtained. Suitable carbon and nitrogen sources are yeast extract, NZ-Amine B (Sheffield's enzymatic digest of casein), Casitone (Difco), glucose, $NH_4Cl$, and the like. The media can be supplemented, advantageously, with inorganic salts, for example, $KH_2PO_4$, $MgSO_4$, $NaCl$, $FeCl_3$, $FeSO_4$, and the like. A preferred medium consists of 0.8% NZ-Amine B, 0.5% glucose, 0.05% KH$_2$PO$_4$, 0.05% NaCl, 0.02% MgSO$_4$·7H$_2$O and 0.001% FeSO$_4$ (pH 7.6).

(B) THE ENZYMATIC CLEAVAGE OF NOVOBIOCIN

The enzymatic cleavage of novobiocin proceeds as follows:

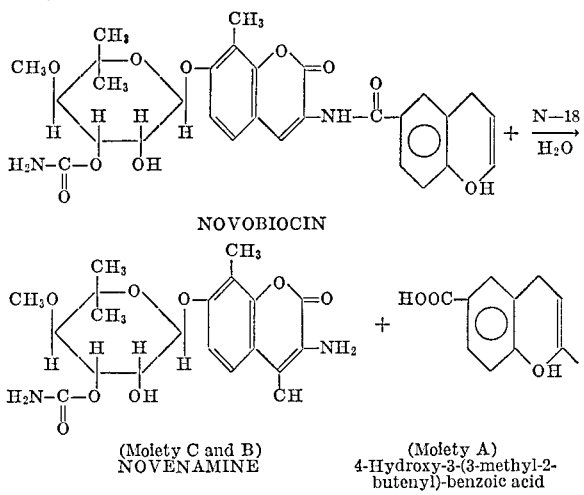

NOVOBIOCIN (Moiety C and B) NOVENAMINE (Moiety A) 4-Hydroxy-3-(3-methyl-2-butenyl)-benzoic acid The above cleavage is accomplished by contacting novobiocin, or dihydronovobiocin, as the free acid or as a base salt thereof, with bacterium N–18, described above. This cleavage is accomplished, advantageously, under anaerobic conditions to give quantitative yields of the cleavage products.

The cells of bacterium N–18 are grown for about 1–3 days at an incubation temperature of about 25–37° C. The preferred growth time is about 1 day at an incubation temperature of about 28° C. Advantageously, the cells are agitated and aerated in the medium during the growth cycle.

The bacterial cells are harvested from the growth medium, advantageously, by centrifugation. The harvested cells are then washed with water and resuspended, advantageously, in a minimum amount of water. This material then can be suspended in an aqueous solution of novobiocin, for example, sodium novobiocin, where the cleavage process takes place. As disclosed above, the cleavage process is conducted, advantageously, under anaerobic conditions. Such anaerobic conditions can be achieved in the laboratory by various means known in the art, for example, overlaying the reaction mixture with an air-imprevious substance, for example, toluene, or, flushing the reaction mixture with nitrogen. Anaerobic conditions in processing equipment larger than labtoratory size can be achieved by various methods known in the art.

Generally, the cleavage of novobiocin by the enzyme formed by bacterium N–18 is complete in about 18–42 hours at room temperature. Higher temperatures, for example, 34° C. to about 37° C. will shorten the reaction time; whereas lower temperatures, for example, 15° C. to about 24° C. will lengthen the reaction time. The cleavage is preferably conducted at room temperature. Higher concentrations of the cells containing the desired enzyme, also shorten the reaction time.

Upon completion of the cleavage process, the bacterial cells are separated from the reaction mixture. These cells of N–18 are quite stable and not readily inactivated during the cleavage process. Thus, the same cells can be used 4–6 times over in cleavage processes as described above. The cells can also be lyophilized and stored for prolonged periods of time at low temperatures (preferably below freezing) without measurable loss of the novobiocin-cleaving ability. The cells are separated from the reaction mixture by centrifugation or filtration. Centrifugation is preferred. The amount of novenamine in the cell-free supernatant can be ascertained by the following method: An aliquot (0.1–0.5 ml.) of supernatant is diluted, adjusted to pH 1.8 with 3 N HCl, extracted with butyl acetate, the extract diluted with two volumes of acidified (3 N HCl) ethanol (pH 2.0), and the amount of novenamine quantitatively determined by its absorption at 295 m$\mu$. The amount of novenamine is calculated according to the following formula:

$$\frac{OD_{295}\,m\mu \times dilution}{30^*} = mg.\ novenamine/ml.$$

Novobiocin concentrations of from about 1–2.5% are cleaved to novenamine (and moiety A) in yields of 91–100% in about 1 day by the above-described cleavage process.

Dihydronovobiocin can be substituted for novobiocin in the above-disclosed enzymatic cleavage process to yield novenamine.

Novenamine is relatively soluble in water and relatively insoluble in solvents in which novobiocin and dihydronovobiocin are extractable at acid pH. For example, novenamine is relatively insoluble in chlorinated lower-alkanes, e.g., methylene chloride, chloroform, ethylene dichloride, and the like; water-immiscible esters, e.g., ethyl acetate, butyl acetate, amyl acetates, and the like; and water-immiscible higher alcohols. Novenamine is unstable in the presence of oxygen in solution under alkaline conditions.

Novenamine can be recovered from the enzymatic cleavage reaction by a variety of procedures, for example, the use of adsorbents, and crystallization from solvents. The first step of any such process, advantageously, involves the removal of the bacterial cells; advantageously, this is done by centrifugation or filtrating of an acidified suspension. In a preferred process, the cleavage supernatant or filtrate containing novenamine, as well as various impurities such as some of the uncleaved starting material, i.e., novobiocin or dihydronovobiocin, is adjusted to an acidic pH of about 2 to 6, then extracted with a solvent in which novenamine is not soluble. Any of the solvents disclosed above can be used; butyl acetate is the preferred solvent. The extraction of the acidified cleavage supernatant removes impurities, for example, novobiocin or dihydronovobiocin, thus leaving a supernatant which can be freeze-dried to a relatively pure preparation of novenamine acid addition salt. This preparation of novenamine can be used in environments where higher purity preparations of novenamine are not essential. Also, this relatively pure preparation of novenamine can be acylated to form antibacterially-active novenamine acylates, as hereinafter described.

Higher purity novenamine preparations can be obtained by subjecting a relatively pure preparation of novenamine, as disclosed above, to crystallization procedures from a solvent. For example, the water in a relatively pure preparation of novenamine hydrochloride can be removed by azeotropic distillation, for example, using absolute ethanol, and novenamine then crystallized from absolute ethanol and ether to afford a purified preparation of novenamine hydrochloride.

Suitable acids for adjusting the pH of the cleavage supernatant, as disclosed above, are strong mineral or organic acids, for example, hydrochloric, hydrobromic, phosphoric, sulfuric, formic, oxalic, and the like. Novenamine will be isolated as the salt of the acid used. For example, if hydrochloric acid is used to adjust the pH of the cleavage supernatant, then novenamine will be isolated as the hydrochloride salt. This salt can be converted to the free base form of novenamine by suspending it in tetrahydrofuran and adding about one equivalent of triethylamine. Other salts of novenamine then can be made

---

*30 equals OD$_{295}$ m$\mu$ of 1 mg. novenamine/ml. (=a) OD=optical density.

from the free base. Salts of novenamine can be used for the same biological purposes as the free base.

Novenamine also can be recovered from the cleavage supernatant, disclosed above, by converting novenamine to an N-acylate. An example of such a procedure is as follows: (1) acidify cleavage supernatant to about pH 2.5 with a mineral acid, for example, hydrochloric acid, (2) extract with a solvent for novobiocin, for example, butyl acetate, (3) adjust pH to about 8.0 with a base, for example, 6 N sodium hydroxide, and (4) add a halide or anhydride of a selected carboxylic acid to form novenamine N-acylate. A nitrogen atmosphere should be maintained in the above-disclosed process once the reaction mixture is adjusted to an alkaline pH.

Mineral acids other than hydrochloric, which were disclosed previously can be used in the above process. Also, other solvents for novobiocin, disclosed previously, can be used for butyl acetate in the above process. Bases which can be used in the above process in place of sodium hydroxide are sodium bicarbonate or sodium carbonate, lithium or potassium hydroxide, bicarbonates, or other bases or basic salts of metals. In addition water soluble tertiary amines such as trialkyl amines (triethylamine) or pyridine, quinoline and the like may be used.

Novenamine also can be recovered from aqueous solutions, for example, the cleavage supernatant, disclosed above, by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd ed. (1958), John Wiley and Sons, Inc. Carboxylic acid cation exchange resins of this type are marketed under the trade names Amberlite IRC-50 and Zeokarb 226. Suitable sulfonic acid resins include nuclear sulfonated polystyrene resins cross-linked with divinylbenzene obtained by the procedure given in page 84 of Kunin, supra. Sulfonated cation exchange resins of this type are marketed under the trade names, Dowex 50, Amberlite IR-120, Nalcite HCR, Chempro C-20, Permutit Q, and Zeokarb 225.

The protonated antibiotic is eluted from the resin with water at an acid pH, advantageously at a pH lower than the pK á of the cation exchange resin used. Satisfactory results are obtained with a pH of about 2 to 6. The excess acid in the eluate is neutralized to about pH 6 to 7 with a base, for example, NaOH or a strongly basic anion exchange resin so as to remove excess acid over that necessary to protonate the basic groups. Suitable anion exchange resins for this purpose are obtained by chlormethylating by the procedure given on pages 88 and 97 of Kunin, supra, polystyrene crosslinked, if desired, with divinylbenzene prepared by the procedure given on page 84 of Kunin, supra, and quaternizing with trimethylamine, or dimethyalkanolamine by the procedure given on page 97 of Kunin, supra. Anion exchange resins of this type are marketed under the trade names Dowex 2, Dowex 20, Amberlite IRA-400, Duolite A-102, and Permutit S-1.

Novenamine can also be recovered from aqueous solutions by adsorption on a surface active absorbent, for example, decolorizing carbon or decolorizing resins, and eluting the adsorbent material with a solution of water and acetone.

Novenamine can be acylated to form novel compounds having antimicrobial activity. These compounds can be represented by the following formula:

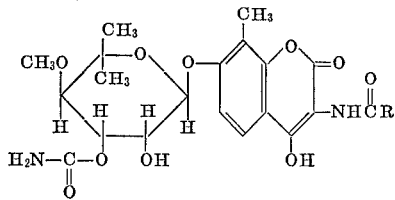

(II)

wherein

is the acyl of a substituted benzoic acid of the formula:

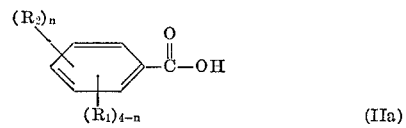

(IIa)

wherein $R_2$ is alkanoyloxy of from 2 to 18 carbon atoms; $n$ is an integer of 1 to 3; $R_1$ is hydrogen, alkyl of from 1 to 18 carbon atoms, inclusive; alkoxy of from 1 to 6 carbon atoms, inclusive; and alkenyl of from 2 to 18 carbon atoms, inclusive.

Alkanoyloxy of from 2 to 18 carbon atoms are acetoxy, propionoyloxy, butanoyloxy, pentanoyloxy, hexanyloxy, heptanoyloxy, octanoyloxy, nonanyloxy, decanoyloxy, undecanoyloxy, dodecanoyloxy, tridecanoyloxy, tetradecanoyloxy, pentadecanoyloxy, hexadecanoyloxy, heptadecanoyloxy, and octadecanoyloxy, and the isomeric forms thereof.

Alkyl of from 1 to 18 carbon atoms are methyl, ethyl, propyl, butyl, pentyl, hexyl, heptyl, octyl, nonyl, decyl, undecyl, dodecyl, tridecyl tetradecyl pentadecyl hexadecyl, heptadecyl, octadecyl, and the isomeric forms thereof.

Alkoxy of from 1 to 6 carbon atoms are methoxy, ethoxy, propyloxy, butyloxy, pentyloxy, hexyloxy, and the isomeric forms thereof.

Alkenyl of from 2 to 18 carbon atoms are vinyl, propenyl, allyl, and isopropenyl, and butenyl, pentenyl, hexenyl, heptenyl, octenyl, nonenyl, decenyl, dodecenyl, tridecenyl, tetradecenyl, pentadecenyl, hexadecenyl, heptadecenyl, octadecenyl, and the isomeric forms thereof.

The procedure in preparing acylates of novenamine depends largely upon the extent to which the starting material has itself been purified. When novenamine is in its relatively pure free base form, less acylating reagent is required. Conversely, the use of crude preparations of novenamine as the starting material requires the use of a larger amount of acylating reagent.

In a preferred process, novenamine acylates of Formula II can be prepared from novenamine by selective N-acylation of novenamine free base with an acyl halide of a carboxylic acid. The acylation is conducted in the presence of water. For example, upon reacting novenamine in an aqueous solution, maintained at a pH of about 8.0 by controlled addition of base or buffer, with benzoyl chloride, there is obtained N-benzoylnovenamine. Hydrogen halide formed during the reaction is neutralized by the base or buffer used. Acylation of novenamine free base in the manner disclosed above prevents available hydroxyls from also being acylated.

Since novenamine is a weak base, adjustment of the pH of an aqueous solution of novenamine to about pH 7.5 to 8.5 insures that sufficient novenamine is in equilibrium in the free base form to N-acylate successfully.

Novenamine acylates of Formula II aso can be prepared by acylating novenamine free base in aprotic solutions, for example, tetrahydrofuran, in the presence of an acid-binding agent, for example, pyridine. The reaction product is then treated with liquid ammonia to remove the O-acyl groups without affecting the N-acyl. As is evident, this procedure is not preferred because of the extra step to remove O-acyl groups. However, this acylation is useful when using acylating agents which are relatively insoluble in water.

The acid halides used as acylating agents to prepare the compounds shown in Formula II can be prepared by a two step process. First, the desired substituted benzoic acid is O-acylated with the halide or anhydride of a selected carboxylic acid in the presence of an acid-binding agent, for example, pyridine. The resulting alkanoyloxy benzoic acid is then reacted with thionyl chloride or oxalyl chloride, in a manner well known in the art, to produce the acid halide of the acylated benzoic acid. For example, 4-acetoxy - 3 - (3 - methyl-2-butenyl) benzoyl chloride is prepared by first acetylating 4-hydroxy - 3 - (3 - methyl - 2 - butenyl)benzoic acid in the presence of pyridine, to form 4 - acetoxy - 3 - (3-methyl-2-butenyl)benzoic acid. This latter compound is then reacted with thionyl chloride to produce 4-acetoxy-3-(3-methyl - 2 - butenyl)benzoyl chloride. Other alkanoyloxy compounds of Formula IIa can be prepared by acylating the desired substituted benzoic acid with an acid halide or anhydride of the desired carboxylic acid in the manner disclosed above.

Novenamine can be acylated to form novobiocin or dihydronovobiocin. Thus, when novenamine is dissolved in water at a basic pH and treated with 4-O-acetyl 3-[3-methyl - 2 - butenyl]benzoyl chloride, the corresponding acylate is formed. Treatment of this with dilute base forms a mixture of novobiocin and isonovobiocin which can be resolved into its components by countercurrent distribution.

Novenamine inhibits the growth of various bacteria, for example, *Staphylococcus aureus, Bacillus subtilis, Diplococcus pneumoniae, Sarcina lutea,* and *Pseudomonas fluorescens.* Accordingly, novenamine can be used for treating breeding places of silkworms to prevent or minimize infections caused by *B. subtilis.* Also, it can be used as a disinfectant on avarious dental and medical equipment contaminated with *S. aureus.*

Novenamine acylates, for example, N-benzoylnovenamine, and N[3 - (3 - methyl - 2 - butenyl)4 - acetoxybenzoyl]novenamine are antibacterials and can be used in the same environments, as described above for novenamine.

The following examples are illustrative of the process and products of the present invention, but are not to be construed as limiting. All percentages are by weight and all solvent mixture proportions are by volume unless otherwise noted.

EXAMPLE 1

Enzymatic cleavage of novobiocin

A loopful of the cells from a slant of bacterium N–18, NRRL B–3652, is inoculated into 250 ml. Erlenmeyer flasks containing 100 ml. of a medium which consists of the following ingredients: 0.8% NZ-Amine B, 0.5% glucose, 0.5% $KH_2PO_4$, 0.05% NaCl, 0.02%

$MgSO_4 \cdot 7H_2O$ and 0.01% $FeSO_4$, pH 6.8–7.8. The flasks are incubated at 28° C. on a rotary shaker. After 18 hours of incubation, when the bacterial population almost reached its maximum density, the bacterial cells are harvested by centrifugation, washed once with distilled water and resuspended in water to give a 5 ml. final volume. One-ml. fractions are then pipetted into a series of 5 test tubes, novobiocin as the sodium salt is added, and the final volume in each test tube adjusted to 3 ml. The tubes are flushed with nitrogen, closed tightly and incubated on a reciprocating shaker. After 20 hours of incubation at room temperature, the cells are removed by centrifugation and the cell-free supernatants are analyzed for the presence of novenamine by the procedure disclosed previously to give the following results:

| Novobiocin [1]: | Novenamine formed percent yields |
|---|---|
| 10 | 100 |
| 25 | 91.7 |
| 50 | 44.4 |
| 75 | 4.9 |
| 100 | 0 |

[1] Initial concentration mg./ml.

EXAMPLE 2

Isolation of novenamine hydrochloride

A 4.5 liter portion of cell-free liquid, from a larger scale enxymatic cleavage process, as described in Example 1, containing cleavage product from 12 grams of novobiocin, is acidified with 15 ml. of 6 N hydrochloric acid and extracted once with 1 liter of methylene chloride, and once with 800 ml. of methylene chloride. The solvent extract is discarded and the aqueous material is freeze-dried; yield, 10 g. of crude novenamine powder which gives an instantaneous purple color with ninhydrin in pyridine.

An 800-mg. aliquot of the above preparation of novenamine is recrystallized from absolute ethanol and ether after removal of water by distillation from absolute ethanol; yield, 400 mg. of novenamine hydrochloride crystals having a melting point >300° C. dec.

A purified preparation of novenamine has the following elemental analysis:

*Analysis.*—Calc'd for $C_{19}H_{25}N_2O_9Cl$ (percent): C, 49.49; H, 5.47; N, 6.08; Cl, 7.69. Found (percent): C, 49.26; H, 6.61; N, 5.81.

Novenamine hydrochloride has the following strong IR bands in mineral oil mull (in cm.$^{-1}$): 3420 (sh.=shoulder), 1485, 3350, 1455, 3190, 1435 (oil), 2920 (oil), 1382 (sh.), 2860, (oil), 1375 (oil), 1718 (sh.), 1340, 1707, 1265, 1670, 1255, 1662, 1130 (sh.), 1606, 1115, 1540, and 1083.

EXAMPLE 3

N-benzoylnovenamine

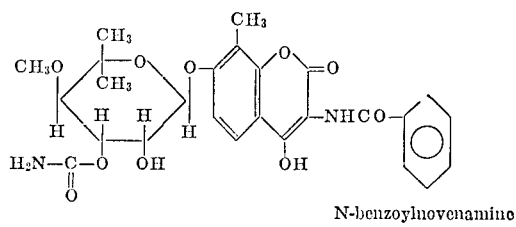

N-benzoylnovenamine

A 1-liter aliquot of centrifuged enzymatic cleavage mixture, prepared according to the procedure described in Example 1, containing about 1.0 g. of novenamine, is acidified to pH 0.5 with hydrochloric acid. This is extracted twice with 350 ml. of ethyl acetate and twice with 250 ml. of methylene chloride to remove unreacted novobiocin and 3-isopentenyl-4-hydroxy benzoic acid. The aqueous layer is then treated with 3 g. of sodium bicarbonate and the pH is adjusted to 8.0 by addition of 6 N hydroxide. A nitrogen atmosphere is maintained. This solution is then vigorously stirred and 5 ml. benzoyl chloride is added. Stirring is continued 1 hr. during which time the pH is maintained between 7 and 9. A second 5-ml. quantity of benzoyl chloride is added and stirring continued 1 hr. more, again maintaining a nitrogen atmosphere and a pH of 7 to 9. The solution is then acidified with hydrochloric acid to pH 2 and extracted with ethyl acetate (2× 200 ml.). After a partial evaporation of the extract to 100 ml., 2 volumes of ether is added and a precipitate (450 g.) of N-benzoylnovenamine is obtained. The filtrate is then evaporated and the residue elached with ether to remove benzoic acid, yielding a residue (300 mg.) of additional N-benzoylnovenamine showing a UV absorption at 323 mµ, $a$=34.0. Recrystallization of this material from ethanol and water yields N-benzoylnovenamine crystals melting at 245° C. dec.

*Analysis.*—Calc'd for $C_{26}H_{28}N_2O_{10}$ (percent): C, 59.08; H, 5.34; N, 5.30. Found (percent): C, 58.24; H, 5.49; N, 5.29.

EXAMPLE 4

N[3-(3-methyl-2-butenyl)4-acetoxybenzoyl]novenamine

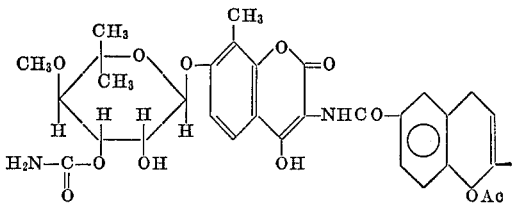

N[3-(3-methyl-2-butenyl)4-acetoxybenzoyl]novenamine

To a 2-g. quantity of novenamine free base suspended in 20 ml. of water containing 1.1 g. of sodium acetate (pH 8.0) is added batchwise 2.4 g. of 4-acetoxy-3-(3-methyl-2-butenyl)benzoyl chloride. A nitrogen atmosphere is maintained. After 3 hrs. of stirring the pH is 4.2. A precipitate (2 g.) is isolated. This precipitate is suspended in chloroform, and the chloroform-soluble fraction is isolated; yield, 0.76 g. This material is subjected to countercurrent distribution in the system ethyl acetate:cyclohexane:ethanol:water (2:3:2.5:2.5). Fractions from tubes 210–260 and 270–300 are combined and evaporated to yield a residue. Crystallization of the residue from ethyl acetate and Skellysolve B (isomeric hexanes) is achieved; yield 70 mg. of crystals of N[3-(3-methyl-2-butenyl)-4-acetoxybenzoyl]novenamine acetoxy novobiocin) having a melting point of 155–160° C.

*Analysis.*—Calc'd for $C_{33}H_{38}N_2O_{12}$ (percent): C, 59.09; H, 5.71; N, 4.18. Found (percent): N, 4.21.

EXAMPLE 5

The acid halides of the following substituted benzoic acids can be substituted for 4-acetoxy-3-(3-methyl-2-butenyl)benzoyl chloride in Example 4 to produce the corresponding novenamine acylates. As indicated above, the substituted benzoic acids are first O-acetylated to form the acetoxy compound and this latter compound is then reacted with thionyl chloride or oxalyl chloride to form the acid halide acylating agent:

o-hydroxybenzoic acid
p-hydroxybenzoic acid
m-hydroxybenzoic acid
2-hydroxy-3-methtylbenzoic acid
2-hydroxy-3-propylbenzoic acid
2-hydroxy-3-isopropylbenzoic acid
2-hydroxy-4-methylbenzoic acid
2-hydroxy-4-isopropylbenzoic acid
2-hydroxy-4-isohexylbenzoic acid
2-hydroxy-3,5-dimethylbenzoic acid
2-hydroxy-3-allylbenzoic acid
2-hydroxy-3-methyl-5-ethylbenzoic acid
2-hydroxy-3-methyl-5-isopropylbenzoic acid
2-hydroxy-6-methyl-3-isopropylbenzoic acid (O-thymotinic acid)
2-hydroxy-4,6-dimethoxybenzoic acid
2-hydroxy-4-methoxy-6-ethoxybenzoic acid
2-hydroxy-6-pentadecadienylbenzoic acid (anacardic acid)
2-hydroxy-6-pentadecylbenzoic acid
2-hydroxy-6-(8-pentadecyl)benzoic acid (Ginkgolic acid)
2-hydroxy-6-heptadecadienylbenzoic acid (Pelandjanic acid)
3-hydroxy-2-methylbenzoic acid
3-hydroxy-2-ethylbenzoic acid
3-hydroxy-4-isopropylbenzoic acid
3-hydroxy-4-ethylbenzoic acid
3-hydroxy-2-methtyl-4-isopropylbenzoic acid
3-hydroxy-2-methyl-4-tert-butylbenzoic acid
3-hydroxy-4-methoxybenzoic acid
3-hydroxy-4-ethoxybenzoic acid
3-hydroxy-4-butoxybenzoic acid
3-hydroxy-2,4-dimethoxybenzoic acid
4-hydroxy-2-methylbenzoic acid
4-hydroxy-3-methylbenzoic acid
4-hydroxy-3-propylbenzoic acid
4-hydroxy-3-isopentylbenzoic acid
4-hydroxy-2-(1-methylbutyl)benzoic acid
4-hydroxy-2-pentadecylbenzoic acid
4-hydroxy-3,5-dimethylbenzoic acid
4-hydroxy-3,5-dipropylbenzoic acid
4-hydroxy-3,5-diisopropylbenzoic acid
4-hydroxy-3,5-di-tert-butylbenzoic acid
4-hydroxy-3,5-di-sec-butylbenzoic acid
4-hydroxy-5-methyl-2-isopropylbenzoic acid
4-hydroxy-5-propyl-3-allylbenzoic acid
4-hydroxy-2-ethoxybenzoic acid
4-hydroxy-3-methoxybenzoic acid
4-hydroxy-3-isopropoxybenzoic acid
4-hydroxy-3-butoxybenzoic acid
4-hydroxy-3-sec-butoxybenzoic acid
4-hydroxy-3-isobutoxybenzoic acid
4-hydroxy-3-isopentoxybenzoic acid
4-hydroxy-2,6-dimethoxybenzoic acid
4-hydroxy-3,5-dimethoxybenzoic acid
5-hydroxy-2-methylbenzoic acid
5-hydroxy-3-methylbenzoic acid
5-hydroxy-2-ethylbenzoic acid
5-hydroxy-2-isoamylbenzoic acid
5-hydroxy-2,3-dimethylbenzoic acid
5-hydroxy-2,4-dimethylbenzoic acid
5-hydroxy-2-methyl-4-isopropylbenzoic acid
5-hydroxy-2-butoxybenzoic acid
5-hydroxy-3,4-dimethoxybenzoic acid
6-hydroxy-2-methylbenzoic acid
6-hydroxy-3-methylbenzoic acid
6-hydroxy-3-ethylbenzoic acid
6-hydroxy-3-propylbenzoic acid
6-hydroxy-3-isopropylbenzoic acid
6-hydroxy-3-tert-butylbenzoic acid
6-hydroxy-2,3-dimethylbenzoic acid
6-hydroxy-2,4-dimethylbenzoic acid
6-hydroxy-2-methyl-3-isopropylbenzoic acid
6-hydroxy-4-methyl-3-isopropylbenzoic acid
6-hydroxy-5-methyl-2-isopropylbenzoic acid
6-hydroxy-3-methylbenzoic acid
6-hydroxy-2-methyl-5-isopropylbenzoic acid
6-hydroxy-2,3,5-trimethylbenzoic acid
6-hydroxy-2,4,5-trimethylbenzoic acid
2,4-dihydroxybenzoic acid (β-Resorcyclic)
2,5-dihydroxybenzoic acid (Gentisic)
2,6-dihydroxybenzoic acid (γ-Resorcyclic)
3,4-dihydroxybenzoic acid (Protocatechuic)
3,5-dihydroxybenzoic acid (α-Resorcyclic)
2,3,4-trihydroxybenzoic acid
2,3,6-trihydroxybenzoic acid
2,4,6-trihydroxybenzoic acid
2,3,5-trihydroxybenzoic acid
3,4,5-trihydroxybenzoic acid (Gallic acid)
2,4,5-trihydroxy-3,6-dimethylbenzoic acid
3,4-dihydroxy-5-methoxybenzoic acid
3,5-dihydroxy-4-methoxybenzoic acid
3,5-dihydroxy-2-methylbenzoic acid
3,5-dihydroxy-4-methylbenzoic acid
2,4-dihydroxy-3-methylbenzoic acid
2,4-dihydroxy-3,6-dimethoxybenzoic acid (Squamatic acid)
2,4-dihydroxy-5-methylbenzoic acid
2,4-dihydroxy-6-methylbenzoic acid
2,4-dihydroxy-5-ethylbenzoic acid
2,4-dihydroxy-6-pentylbenzoic acid
2,4-dihydroxy-6-heptylbenzoic acid
2,6-dihydroxy-3-isopentyl-4-methoxybenzoic acid
2,6-dihydroxy-4-methoxybenzoic acid
2,6-dihydroxy-4-methoxy-3(3-methyl-2-butenyl)benzoic acid
2,6-dihydroxy-4-methylbenzoic acid
2,6-dihydroxy-3-methylbenzoic acid 2,6-dihydroxy-4-pentadecylbenzoic acid
2,5-dihydroxy-3-methoxybenzoic acid
2,5-dihydroxy-4-methoxybenzoic acid
2,5-dihydroxy-4-methoxy-6-methylbenzoic acid
2,5-dihydroxy-3-methylbenzoic acid
2,5-dihydroxy-4-methylbenzoic acid
4,5-dihydroxy-2-methylbenzoic acid
4,6-dihydroxy-2-methylbenzoic acid
5,6-dihydroxy-2-methylbenzoic acid
5,6-dihydroxy-3-methylbenzoic acid
3,5-dihydroxy-2,4-dimethylbenzoic acid
3,5-dihydroxy-2,6-dimethylbenzoic acid
2,6-dihydroxy-3,5-dimethylbenzoic acid
3,6-dihydroxy-2,4,5-trimethylbenzoic acid
3-hydroxy-4-allylbenzoic acid
3-hydroxy-2-allylbenzoic acid
4-hydroxy-3-allyl-5-propylbenzoic acid
4-hydroxy-3,5-diallylbenzoic acid
4-hydroxy-3(3-methyl-2-butenyl)benzoic acid The above benzoic acids can be converted to other O-acylates by acylating with the appropriate acid halide or anhydride of an alkanoic acid, for example, propionic, butyric, pentanoic, hexanoic, heptanoic, octanoic, nonanoic, decanoic, undecanoic, dodecanoic, tridecanoic, tetradecanoic, pentadecanoic hexadecanoic, heptadecanoic, octadecanoic, and the isomeric forms thereof. These acylates can then be reacted with thionyl chloride or oxalyl chloride to form the acid halide which can then be substituted for 4-acetoxy-3-(3-methyl-2-butenyl) benzoyl chloride in Example 4 to produce the corresponding novenamine acylates.

What is claimed is:

1. Novenamine, a compound of the formula:

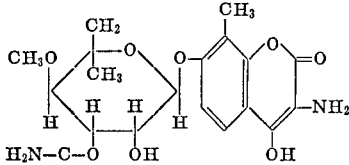

which is capable of reacting with 4-acetoxy 3-[3-methyl-2-butenyl]benzoyl chloride to produce acetoxy novobiocin.

2. Acid addition salts of novenamine, the compound defined in claim 1.

3. Novenamine hydrochloride, a compound of claim 2.

4. Solid novenamine hydrochloride having the structural formula:

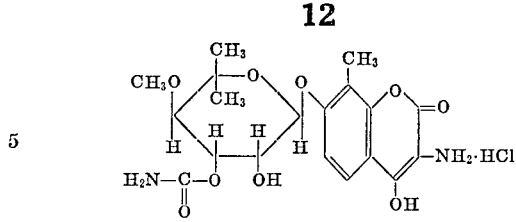

and melting above 300° C. (dec.).

5. A compound of the formula:

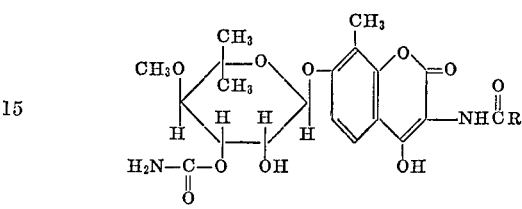

wherein

is the acyl of a substituted benzoic acid of the formula:

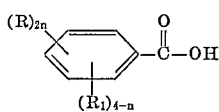

wherein $R_2$ is alkanoyloxy of from 2 to 18 carbon atoms; $n$ is an integer of 1 to 3; $R_1$ is hydrogen, alkyl of from 1 to 18 carbon atoms, inclusive; alkoxy of from 1 to 6 carbon atoms, inclusive; and alkenyl of from 2 to 18 carbon atoms, inclusive.

6. N[3-(3-methyl-2-butenyl)-4-acetoxy benzoyl]novenamine, a compound of claim 5.

References Cited

UNITED STATES PATENTS 2,966,484   12/1960   Walton et al. ____ 260—210 N
3,049,551   8/1962    Walton et al. ____ 260—210 N LEWIS GOTTS, Primary Examiner
J. R. BROWN, Assistant Examiner U.S. Cl. X.R.

260—210 NOVO, 999; 195—80; 260—479